(12) United States Patent
Kangasoja

(10) Patent No.: US 8,202,330 B2
(45) Date of Patent: Jun. 19, 2012

(54) METHOD FOR GASIFYING SOLID FUEL AND CONCURRENT GASIFIER

(75) Inventor: Eero Kangasoja, Kiiskilampi (FI)

(73) Assignee: Gasek Oy, Reisjarvi (FI)

( * ) Notice: Subject to any disclaimer, the term of this patent is extended or adjusted under 35 U.S.C. 154(b) by 638 days.

(21) Appl. No.: 12/438,847

(22) PCT Filed: May 23, 2008

(86) PCT No.: PCT/FI2008/050300
§ 371 (c)(1),
(2), (4) Date: Feb. 25, 2009

(87) PCT Pub. No.: WO2008/145814
PCT Pub. Date: Dec. 4, 2008

(65) Prior Publication Data
US 2010/0018120 A1    Jan. 28, 2010

(30) Foreign Application Priority Data

May 25, 2007   (FI) ...................... 20075374

(51) Int. Cl.
*B01J 7/00* (2006.01)
*C10J 3/76* (2006.01)
*C10J 3/72* (2006.01)
*C10J 3/46* (2006.01)
*C01B 6/24* (2006.01)
*C01B 3/24* (2006.01)

(52) U.S. Cl. ............... 48/61; 48/67; 48/74; 48/197 R; 423/644; 423/650

(58) Field of Classification Search .......... 48/61, 67, 48/74, 197 R; 423/644, 650
See application file for complete search history.

(56) References Cited

U.S. PATENT DOCUMENTS 4,459,136 A    7/1984    Linneborn
(Continued)

FOREIGN PATENT DOCUMENTS

DE    3509341    2/1986
(Continued)

OTHER PUBLICATIONS

Finnish Office Action, Dated Aug. 31, 2010, in Application No. 20075374.

(Continued)

*Primary Examiner* — Matthew Merkling
(74) *Attorney, Agent, or Firm* — Young & Thompson

(57) ABSTRACT

A method for gasifying solid fuel in a co-current gasifier having a fuel silo and a combustion chamber. The method includes a pyrolysis phase in which the fuel decomposes into pyrolysis products, and a gasification phase in which the pyrolysis products are gasified into product gas. Heat transfer from the combustion chamber to the fuel silo is restricted to ensure that the fuel does not dry and pyrolysis does not take place in the fuel silo. The beginning of the pyrolysis is intentionally transferred as close to the gasification phase as possible, and an attempt is made to make the duration of the pyrolysis phase as short as possible. The rise of the fuel temperature is slowed down by transferring heat generated in the gasification phase to a medium, such as gasification air. In the co-current gasifier between the fuel silo and the combustion chamber, there is a cooling channel, which restricts heat transfer and also functions as a preheater for the gasification air.

11 Claims, 2 Drawing Sheets

U.S. PATENT DOCUMENTS

Figure 1:
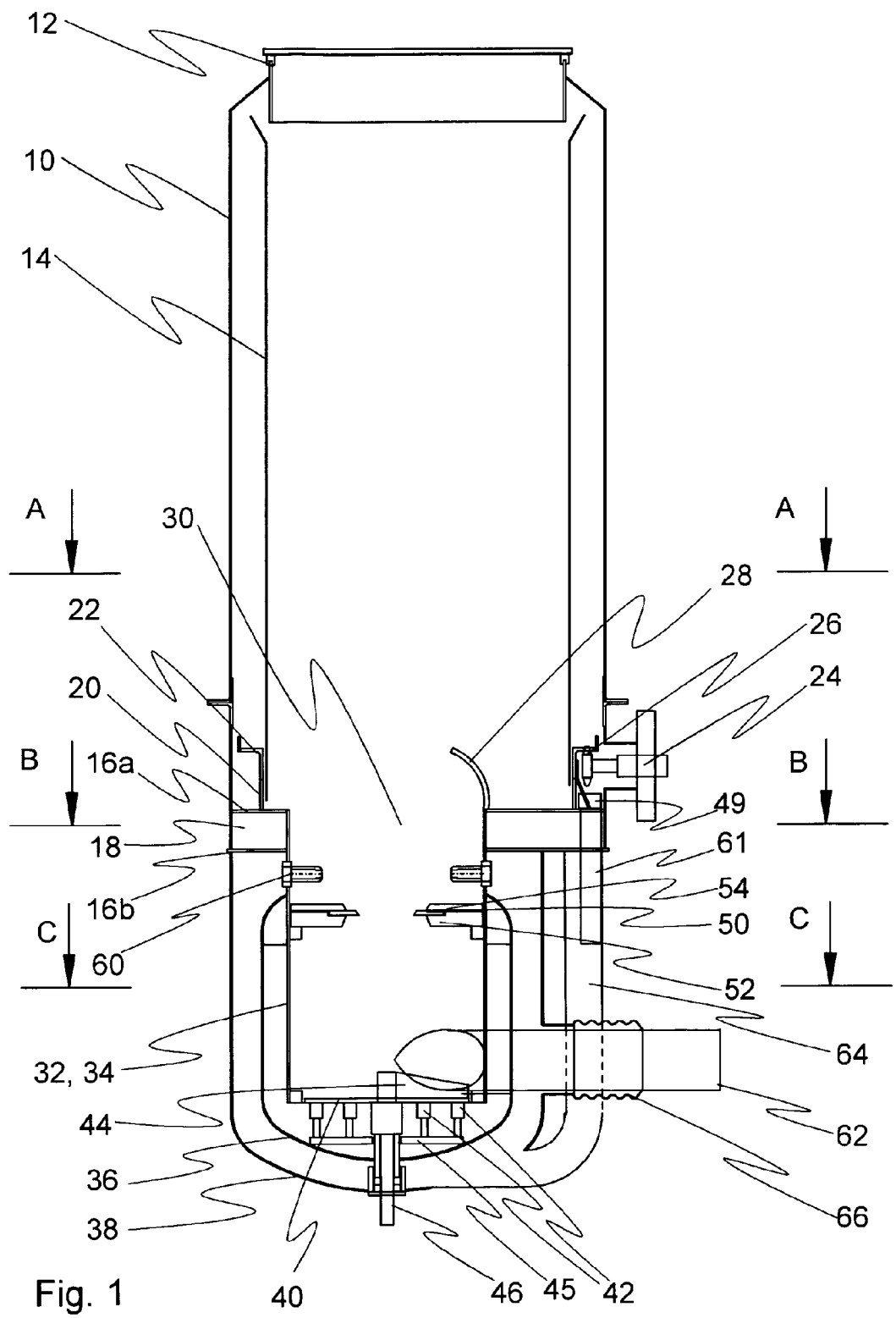

| | | | |
|---|---|---|---|
| 4,530,702 A | | 7/1985 | Fetters |
| 4,583,992 A | | 4/1986 | Rogers |
| 4,764,185 A | | 8/1988 | Mayer |
| 6,112,677 A | * | 9/2000 | Kuntschar et al. ............ 110/315 |

FOREIGN PATENT DOCUMENTS

| | | |
|---|---|---|
| DE | 10200180 | 7/2003 |
| EP | 0693545 A1 | 1/1996 |
| EP | 0839893 A1 | 5/1998 |
| EP | 1442101 | 3/2005 |
| JP | 2001-521056 A | 11/2001 |
| JP | 2004-189932 A | 7/2004 |
| JP | 2008063363 | 3/2008 |
| WO | 2007080210 | 7/2007 |

OTHER PUBLICATIONS

Finnish Search Report dated Feb. 8, 2008, in priority application.
International Search Report dated Oct. 31, 2008, in PCT application.
Finnish Search Report in Corresponding Application 20095346 Dated Feb. 5, 2010.
Korean Office Action, dated Dec. 27, 2011, from corresponding Korean application.
Canadian Office Action, dated Jan. 3, 2012, from corresponding Canadian application.

* cited by examiner

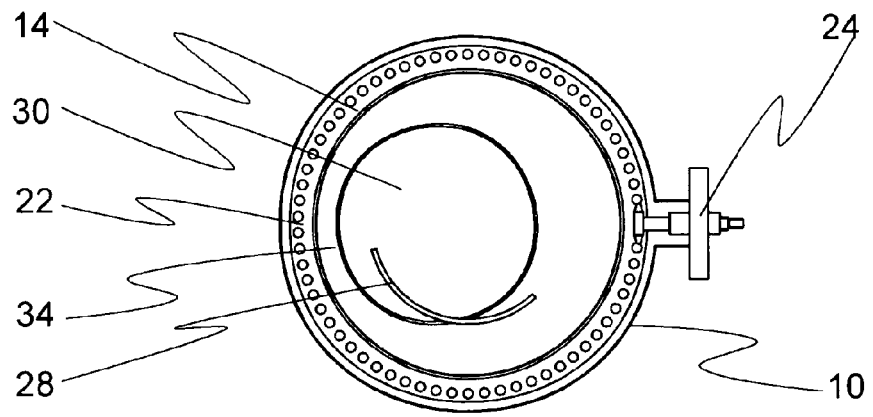
Fig. 2a — Section A-A
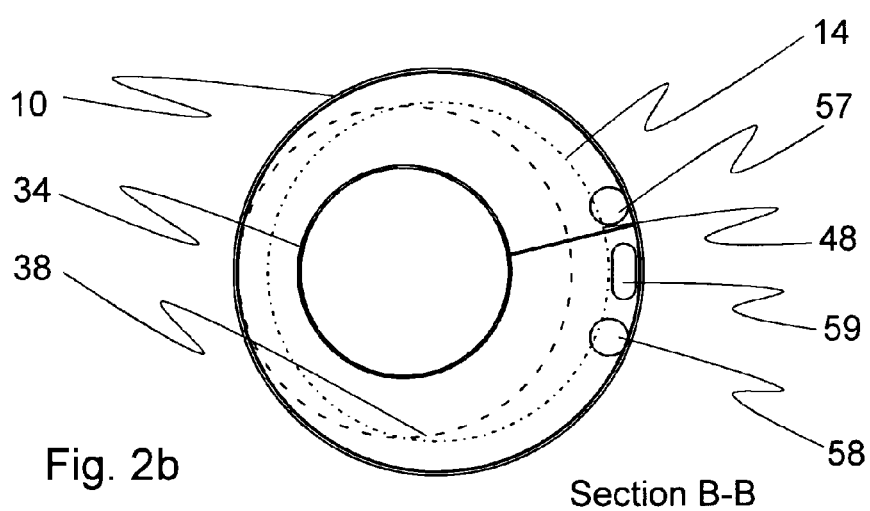
Fig. 2b — Section B-B
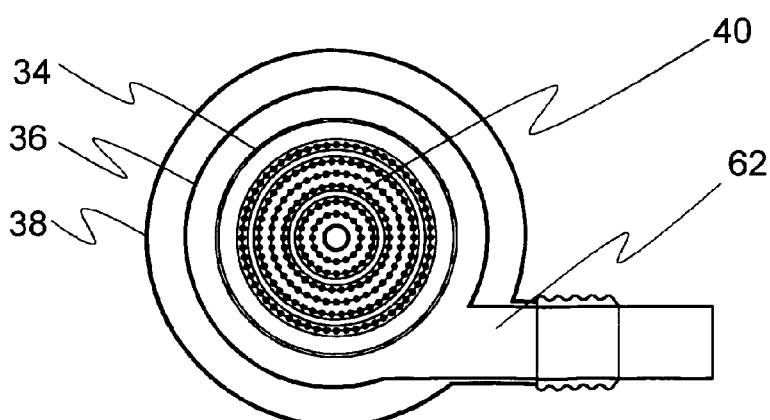
Fig. 2c — Section C-C

METHOD FOR GASIFYING SOLID FUEL AND CONCURRENT GASIFIER

The invention relates to a method for gasifying solid fuel, the method comprising a pyrolysis phase, in which the fuel decomposes into pyrolysis products, and a gasification phase, in which the pyrolysis products are gasified into product gas. The invention also relates to a co-current gasifier operating in accordance with the method.

Combustible product gas can be manufactured from solid fuels, such as wood chips, by various gasification methods. According to their principle of operation, gasifiers can be divided into fixed layer gasifiers, countercurrent gasifiers, cross-draught gasifiers and co-current gasifiers. The gasifier used in co-current gasification comprises a vertical reactor, in which the fuel gasification takes place. The fuel is fed to the upper part of the reactor, from which it flows downwards by gravity. The air required in gasification is supplied to the central part of the reactor, and the product gas generated is removed from the lower part of the reactor.

The following zones are present in a co-current reactor in operation: In the upper part of the reactor, there is a drying zone where the fuel is warmed and dried up. The heat required for drying is obtained from the hot lower part of the reactor, from which it is conducted upwards along the walls of the reactor and through the fuel layer. Because the fuel layer generally conducts heat poorly, the drying zone is relatively high in relation to the total height of the reactor. Below the drying zone there is a pyrolysis zone, where the fuel is heated in oxygen-free conditions. Volatile, primary tars and pyrolysis gases are extracted from the fuel there, and solid residual carbon is generated. Pyrolysis generally takes place at a temperature of 200 to 500° C. Below the pyrolysis zone there is a combustion zone, where the residual carbon burns in a high temperature. Combustion is maintained by conducting air or oxygen to the combustion zone. When the pyrolysis gases and the vapourized primary tars run through the combustion zone, the tar compounds are cracked into smaller compounds. In the combustion zone, when the residual carbon reacts with carbon dioxide and water vapour, gasification takes place, and product gas containing carbon dioxide, carbon monoxide, hydrogen and methane is generated. Gasification generally takes place at a temperature of 600 to 1000° C. There is a narrowing in the lower part of the reactor, and below it a combustion chamber, from which the product gas generated is discharged. A co-current gasifier, which uses the principle described above, has been disclosed in the patent specification US 2002/0069798.

There are many drawbacks related to the prior art gasification methods and co-current gasifiers. The fuel used in gasifiers should be as dry as possible. This is due to the fact that if the fuel is damp, temperatures that are sufficiently high for cracking the primary tars are not reached in the gasification reactor. In addition, the structure of the fuel should mainly be granular, so that the fuel layer would maintain its gas permeability. In spite of the use of dry and granular fuel, the product gas manufactured by the prior art methods contains a considerable amount of impurities and tar compounds, which make it more difficult to use the product gas in engines, for example. The use of product gas in engines always requires a certain amount of purification, which causes additional costs. However, especially the removal of tar from the product gas is problematic and expensive, particularly in small-scale production. Because of the purification problems, product gas is used nowadays almost entirely for the production of thermal energy by burning the product gas. In the known solutions, the ash generated in gasification is removed by mechanical equipment from the combustion chamber of the gasifier. The ash to be removed is hot and may contain blazing charcoal, and therefore there is always a risk of fire involved in ash removal.

It is an objective of the invention to provide a new method for gasifying fuel and a gasifying generator, by which the drawbacks and disadvantages related to the prior art can be substantially reduced.

The objectives of the invention are achieved by a method and a co-current gasifier, which are characterized in what is set forth in the independent claims. Some preferred embodiments of the invention are presented in the dependent claims.

The invention relates to a method for gasifying solid fuel, the method comprising a pyrolysis phase, in which the fuel decomposes into pyrolysis products, and a gasification phase, in which the pyrolysis products are gasified into product gas. The basic idea of the method is actively to slow down the rise of the temperature of the fuel before the pyrolysis phase starts. The rise of the fuel temperature is slowed down by restraining the transfer of the heat generated in the gasification phase to the fuel. The transfer of heat to the fuel is preferably restrained by transferring heat to a medium, such as a liquid or the gasification air. By preventing the rise of the fuel temperature, it is ensured that the fuel is not dried up in the fuel silo and that the pyrolysis cannot start while the fuel is still in the fuel silo. In the method, the start of the pyrolysis is intentionally transferred as close to the gasification phase as possible, and an attempt is made to make the duration of the pyrolysis phase as short as possible. The method according to the invention is thus exactly opposite to that of the known gasifiers, in which an attempt is made to dry the fuel when it is in the fuel silo, and in which the pyrolysis already starts in the fuel silo.

In a preferred embodiment of the invention, biofuel having a humidity of over 20 percent by weight or preferably over 30 percent by weight is used.

The co-current gasifier according to the invention has a fuel silo for the fuel to be gasified and a combustion chamber placed below the fuel silo. The gasifier also has means for conducting the gasification air into the gasifier, and a product gas pipe for conducting the generated product gas out from the gasifier. The basic idea of the gasifier is that there is a cooling channel between the fuel silo and the combustion chamber, by which the transfer of heat from the combustion chamber to the fuel silo is actively restrained. The cooling channel is preferably formed so that the gasifier has an upper floor, which forms the upper surface of the cooling channel, and a lower floor forming the lower surface of the cooling channel, and the fuel silo is placed above the upper floor and the combustion chamber below the lower floor.

In a preferred embodiment of the co-current gasifier there are concentric holes in the upper and lower floor, which form a connection between the fuel silo and the combustion chamber. The cooling channel is thus a ring-shaped part having an eccentric hole leading from the fuel silo to the combustion chamber.

In another preferred embodiment of the gasifier according to the invention, the combustion chamber comprises an internal jacket, intermediate jacket, external jacket and a grate. The triple wall structure of the combustion chamber provides good fire safety and thermal insulation.

In a third preferred embodiment of the invention, the combustion chamber and the fuel silo are placed eccentrically in relation to each other. In addition, the wall of the fuel silo extends at least at some points outside the area delimited by the external jacket. It is clear that heat cannot be transferred from the combustion chamber to the part of the fuel silo which is outside the area delimited by the external jacket, and therefore this part of the fuel silo is efficiently cooled and remains cooler than the other areas.

In a third preferred embodiment of the gasifier according to the invention, the fuel silo is formed as rotating around the longitudinal axis, and the gasifier has a rotator for rotating the fuel silo. The rotation of the fuel silo has the effect that a part of the lower part of the fuel silo is always in its turn in the efficiently cooled area. Rotation of the silo also prevents vaulting of the fuel inside the silo.

In a fourth preferred embodiment of the gasifier according to the invention, the internal jacket is fastened from its upper part to the lower floor and the intermediate jacket is fastened from its upper edge to the internal jacket, at a distance from the lower floor. The gasification air is preferably arranged to be conducted to the combustion chamber through a space between the intermediate jacket and the external jacket.

In a fifth preferred embodiment of the gasifier according to the invention, there is a fire ring in the upper part of the internal jacket of the combustion chamber for forming a narrowing point of the cross-sectional area in the upper part of the combustion chamber.

A sixth preferred embodiment of the gasifier according to the invention comprises air nozzles, which are placed in the internal jacket of the combustion chamber above the fire ring.

The invention has the advantage that it does not set high requirements for the dampness or composition of the fuel to be used. Fuels that can be used in the method and gasification generator include relatively damp, air-dried (moisture content 30 to 45 percent by weight) pine, spruce and other kinds of wood, chipped with the bark on, and biowaste.

In addition, the invention has the advantage that very little tar is generated in gasification, and therefore not much purification of the product gas is required. The low tar content also enables burning the product gas in devices with delicate functions, such as engines of vehicles.

A specific advantage of a preferred embodiment of the co-current gasifier is the fact that no separate ash removal equipment is required in it, because the ash is transferred as fly ash together with the product gas from the combustion chamber to the gas cleaner. Because there is no ash removal opening in the combustion chamber of the gasifier, the risk of a fire breaking out in the vicinity of the gasifier is reduced.

In the following, the invention will be described in more detail. Reference will be made to the accompanying drawings, in which FIG. 1 shows an example of a co-current gasifier according to the invention as a vertical cross-section, and FIGS. 2a to 2c show the co-current gasifier of FIG. 1 as exemplary horizontal cross-sections.

In FIG. 1, an example of a gasifying generator according to the invention is shown as a vertical cross-section. FIGS. 2a to 2c show the gasifier of FIG. 1 as horizontal cross-sectional drawings as seen from the sectional levels A-A, B-B and C-C. In use, the co-current gasifier is in the vertical position shown in FIG. 1. Directional expressions used in the description, such as upwards, downwards, above, below, upper surface and lower surface mean directions when the gasifier is in the vertical position shown in FIG. 1. If the gasifier is in some other position than the one shown in FIG. 1, the directional expressions change correspondingly.

The gasifier has a cylindrical outer cover 10, and on its upward pointed end there is an airtight, openable cap 12. Instead of the cap according to FIG. 1, the gasifier may also have some other cap structure, which enables automatic fuel feed. Inside the outer cover there are two essentially parallel floors at a distance from each other, an upper floor 16a and a lower floor 16b, which define between themselves a ring-shaped cooling channel 18, through which the gasification air required for the fuel gasification is led into the gasifier. The outer wall of the gasifier constitutes the outer wall of the cooling channel, and the internal jacket 34 of the combustion chamber of the gasifier constitutes the inner wall of the cooling channel. The part below the cooling channel constitutes the gasifier part of the co-current gasifier, in which the actual gasification of the fuel takes place. The part above the cooling channel 18 includes means for storing the fuel and feeding it to the gasifier part. In use, the cooling channel 18 between the fuel part and the gasifier part functions as a structural part which reduces the transfer of heat from the gasifier part to the fuel part.

On the upper surface of the upper floor 16a there is a ring-shaped support collar 20, which controls the fuel silo 14, which is open at its both ends and to which the fuel to be gasified is fed through the openable cap 12. The diameter of the fuel silo is clearly smaller than the diameter of the outer cover, so there remains a gap between the fuel silo and the outer cover, preferably having a width of 50 mm. The purpose of the gap is to enable the rotation of the fuel silo inside the outer cover. Although the gap is not separately cooled by conducting cooling air through it, for example, the outer cover of the gasifier remains at under 50° C. during the use of the gasifier, i.e. relatively cool. The length of the fuel silo as measured in the vertical direction of the gasifier is about ⅔ of the total height of the gasifier. Preferably, the length of the fuel silo is 1100 mm and the diameter 500 mm. In the vicinity of the first end of the fuel silo, pointed downwards, there is a ring-shaped, toothed rotating circle 22, the diameter of which is essentially equal to the diameter of the support collar 20. The first end of the fuel silo is fitted inside the support collar in such a way that the downward pointed edge of the rotating circle is set towards the upward pointed edge of the support collar. On the wall of the outer cover 10 there is arranged a fuel silo rotating device 24, which comprises a toothed gear 26 installed at the end of the axle, and an actuator rotating the axle (the actuator is not shown in the figures). The teeth of the toothed gear have been arranged to fit in the cogging of the rotating circle 22 in such a way that rotating the gear causes the fuel silo to rotate around its longitudinal axis. The rotating circle and the fuel silo are supported on the toothed gear 26 in such a way that the rotation of the fuel silo is almost frictionless.

The upper and lower floors 16a, 16b, the outer cover 10 and the internal jacket 34 constitute the walls of the ring-shaped cooling channel. Inside the cooling channel there is a baffle plate 48 (FIG. 2b), which closes the channel entirely at one point. On the first side of the baffle plate in the lower floor there is an inlet hole 57, through which the gasification air can flow into the cooling channel, and on the second side of the baffle plate there is an air outlet hole 58, from which air can flow out from the cooling channel. The gasification air thus circulates an essentially full round in the cooling channel. In addition, the upper and lower floors have concentric holes 59, through which there runs an exhaust pipe 61. The upper end of the exhaust pipe ends at the upper surface of the upper floor in the space between the fuel silo and the outer cover, and its lower end reaches outside the gasifier. Through the exhaust pipe, the humidity condensed between the fuel silo and the outer cover and other impurities accrued there are removed from the gasifier. Preferably there is a scraper 49 fastened to the outer surface of the fuel silo, the edges of which run along the surface of the upper floor and the wall of the outer cover and thus lead the water and impurities between the fuel silo and the outer cover to the exhaust pipe at each round.

In the upper and lower floors there are holes 30, through which a connection is opened from the fuel silo 14 to the gasification part. The holes 30 are placed concentrically in the upper and lower floor, but eccentrically with regard to the centre line of the fuel silo. The fuel silo is thus located eccentrically above the combustion chamber, as can be seen from FIGS. 1 and 2b. On the upper surface of the upper floor there is a catcher 28, which leads and transfers the fuel in the fuel silo, which rotates along with the fuel silo, through the holes in the floor to the gasification compartment. The catcher is a curved, trough-shaped metal plate, which is fastened at its lower edge to the upper floor by welding so that the upper edge of the catcher extends to the lower part of the fuel silo. When the fuel silo rotates, the upper edge of the catcher scrapes the fuel layer in the fuel silo from below and turns around along with the fuel silo, whereby the loose fuel material falls through the holes 30 in the floors to the gasification part. Due to the eccentric location of the hole 30 with regard to the centre line of the fuel silo, when the fuel moves with the fuel silo, which is in a rotary movement, along the surface of the upper floor 16a, the catcher doses the fuel to the gasification compartment from the top of the upper floor from an area, which is cooled by the gasification air flowing to the cooling channel through the inlet opening 57.

In the gasification compartment of the co-current gasifier there is a combustion chamber 32, which has a triple wall structure comprising an internal jacket 34, intermediate jacket 36 and external jacket 38. A relatively cool outer surface of the external jacket 38 is obtained by the triple wall. The fuel silo 14 is located eccentrically above the combustion chamber in such a way that part of the edge of the fuel silo extends outside the area delimited by the external jacket. A part of the lower part of the fuel silo is thus continuously outside the area delimited by the external jacket. Also the outer cover, which forms the outer wall of the cooling channel, extends partly outside the area delimited by the external jacket (FIG. 2b). The internal jacket and the intermediate jacket constitute a gastight combustion chamber 32, from which sparks cannot escape to the environment, and the combustion air does not enter into the combustion chamber in an uncontrolled manner. The internal jacket, which forms the innermost wall surface of the combustion chamber, is a cylindrical part having its upper edge on the level of the upper floor 16a and extending through the holes 30 in the upper and lower floor to the gasification compartment. The internal jacket has preferably a length of about 480 mm and a diameter of about 320 mm. The internal jacket is fastened to the edges of the holes in the floors by welding, whereby it also constitutes one wall of the cooling channel 18. On the level of the lower edge of the internal jacket there is a round grate 40. The grate is supported by two support rings 42, which are fastened by a pin joint to round rods, which are fastened to a bearing flange 45. The bearing flange rests on top of the intermediate jacket, which extends below the grate. This structure enables detachment of both the grate and its structures. Through the central part of the grate runs a vertical axle 46, the first end of which extends above the grate and the second end extends through the wall of the combustion chamber outside the gasifier. A wing-like ash scraper 44 is fastened to the first end of the axle. The axle can be turned by an actuator (not shown in the figure), which causes the ash scraper to rotate along the surface of the grate and the ash to drop through the grate. Ash removal from the grate can also be implemented so that the ash scraper is arranged as fixed in the combustion chamber and the grate is fastened at the end of a rotatable axle. Rotating the axle then sets the grate in a rotary movement.

On the inner surface of the internal jacket, a little below the height level of the lower floor 16b, there is a horizontal, ring-shaped fire ring 50 forming in the upper part of the combustion chamber a narrowing, which reduces its cross-section. The fire ring is a round, plate-like part with a hole in the middle. The diameter of the hole of the fire ring is preferably 90 mm. The fire ring is supported on its place in a way that enables thermal movement by fastening a lower support ring 52 to the inner wall of the internal jacket and on top of it an upper support ring 54 and by fitting the fire ring in the gap between the support rings.

Around the internal jacket there is an intermediate jacket 36, which forms a closed wall surface outside the cylindrical side wall of the internal jacket and below the grate 40. The intermediate jacket turns inward from its upper edge and connects with the internal jacket a little above the fire ring. The intermediate jacket is preferably made of steel and fastened to the internal jacket at its upper edge by welding. The purpose of the intermediate jacket is to function as a radiation heat insulator. Around the internal jacket there is an external jacket 38, which forms the outermost casing of the combustion chamber. A space is formed between the external jacket and the intermediate jacket surrounding the combustion chamber and functioning as preheating space for the gasification air. The upper surface of the preheating space is formed by the lower floor 16b. Because the outer diameter of the external jacket 38 of the combustion chamber is smaller than the outer diameter of the lower floor, and because the combustion chamber is located eccentrically below the lower floor, a part of the lower floor extends outside the area delimited by the external jacket (FIG. 2b). This part of the lower floor which is outside the external jacket has an outlet opening 58 (FIG. 2b), to which the first end of the air pipe 64 is connected. The second end of the air pipe is led through a hole made in the external jacket to a space between the external jacket and the intermediate jacket below the grate. Through the outlet opening, the gasification air can flow from the cooling channel to the air pipe 64 and along the air pipe further to the lower part of the preheating space. In the part between the lower floor and the upper edge of the intermediate jacket, the preheating space is delimited by the internal jacket 34. This ring-shaped wall portion of the preheating space is equipped with air nozzles 60, through which the gasification air is led from the preheating space to above the fire ring. There are preferably six air nozzles, and the diameter of their air outlets is 12 mm. The structures of the gasification compartment are dimensioned and the air nozzles located in such a way that the distance of the midpoint of the air nozzle from the level of the upper surface of the upper floor is 105 mm and the distance from the fire ring 60 mm. Especially the small distance between the fire ring and the air nozzle is significant, because according to prior knowledge based on experience, such a small distance between the fire ring and the air nozzle increases the formation of tar. However, this is not the case with the apparatus according to the invention, as will be shown later.

A product gas pipe 62 runs from the inside of the combustion chamber to the outside of the gasifier. The first end of the product gas pipe fastens tangentially to the intermediate jacket 36 (FIG. 2c), and runs through the wall of the intermediate jacket. The second end of the product gas pipe is led via a hole through the external jacket 38 to the outside of the gasifier. At the through-hole of the external jacket and around the product gas pipe there is a flexible bellows seal 66, which ensures the tightness of the throughhole also when thermal movements occur. In use, a starting exhauster is arranged at one end of the product gas pipe (starting exhauster not shown in the figures), by means of which the gasification process is started. When the gasifier is connected to the engine, the running engine itself develops the suction of the product gas required when in operation. When product gas is used as fuel in other applications, a separate exhauster is arranged at the end of the product gas pipe for the suction of the product gas.

The product gas is removed from the combustion chamber through the grate 40 to the space between the internal jacket and the intermediate jacket, and therefrom along the product gas pipe further to the outside of the gasifier. The tangential fastening of the product gas pipe to the intermediate jacket generates a turbulent flow of product gas below the grate, lifting the ash generated in the combustion chamber with it. The ash is removed from the combustion chamber along with the product gas, and it is separated from the product gas in a separate washer (the washer is not shown in the figures), where the product gas is purified of other impurities as well. Separate ash removal equipment or a sweeping hole is thus not required in the co-current gasifier according to the invention.

The co-current gasifier according to the invention also includes an ignition mechanism, by which the fuel to be gasified is ignited (the ignition mechanism is not shown in the figures). Various known ignition methods, which are not described in more detail in this connection, can be used in the gasifier. The ignition mechanism is preferably an automatic, liquid gas operated or electrically operated mechanism. In practice, the automatic ignition mechanism is only required during the startup of the gasifier, when there is no smouldering fuel in the combustion chamber. Due to the good thermal insulation of the combustion chamber, the readiness of the gasifier to start remains good for a long time after its use has been interrupted. It has been found that no reignition is required if restarting takes place within less than three hours from the interruption of use. In that case, restarting only requires that the starting exhauster is started and fuel is dosed to the combustion chamber.

The co-current gasifier according to the method of the invention functions in the following manner. The cap 12 of the fuel silo 14 is opened and a suitable amount of fuel is dosed to the fuel silo, whereupon a part of the fuel flows into the combustion chamber 32. After that, the cap is closed airtightly. The co-current gasifier according to the invention can also be equipped with an automatic filling mechanism comprising a lock feeder, by which fuel is fed to the fuel silo. Then it is not necessary to open the cap of the fuel silo for the duration of the fuel feed.

Pine, birch, spruce, willow or other kinds of wood chipped with the bark on can be used as fuel in the gasifier. The wood chips may be air-dried, in which case their moisture content may be even 30 to 40 percent by weight. It is also possible to use household waste as a part of the fuel. The quality requirements set for the fuel used in the invention are thus clearly lower than in the prior art co-current gasifiers.

The exhauster connected to the product gas pipe is started and the fuel in the combustion chamber is ignited. Due to the underpressure achieved by the exhauster, gasification air flows into the cooling channel 18 through an inlet opening 57 at the starting end of the channel. The gasification air moves from the cooling channel through the outlet opening 58 to the air pipe 64 and along the air pipe further to the preheating space between the intermediate jacket 36 and the external jacket 38, from where it is led through the air nozzles 60 to the combustion chamber above the fire ring 50.

The co-current gasifier according to the invention reaches its normal operating temperature after 3 to 5 minutes from ignition, depending on the fuel used. It has been found by measurements that during use, there is a temperature of 1100 to 1300° C. inside the combustion chamber. Furthermore, it has been found by measurements that the temperature of gasification air in the preheating state is about 230° C. when it enters the air nozzles. The heating of the gasification air thus functions in the designed manner.

In the prior art co-current gasifiers, the heat generated in the combustion chamber is transferred by conduction along the walls of the fuel silo a long way into the fuel silo, from which the heat is further transferred to the fuel in the fuel silo. The warming up of the fuel is regarded as a desired property, because due to it, water is evaporated from the fuel and the fuel dries up, whereby its heat value improves. In the prior art co-current gasifiers, a clear drying zone is generated in the upper part of the fuel silo, in which water is removed from the fuel. After drying, the fuel goes into the pyrolysis phase, during which volatile primary tars and pyrolysis gases are separated from the fuel, and solid residual carbon is generated. The starting of the pyrolysis generally requires a temperature of over 200° C. In the prior art solutions, such a temperature is present at a relatively high level in the fuel silo, and thus the pyrolysis takes place already in the fuel silo.

In a co-current gasifier according to the invention, between the fuel silo 14 and the combustion chamber there is a cooling channel 18, the purpose of which is to reduce the conduction of heat from the combustion chamber to the fuel silo. The gasification air is led into the gasifier through a cooling channel, whereby heat is transferred from the walls of the cooling channel to the gasification air, whereupon the temperature of the gasification air rises. The cooling channel thus also functions as a preheater for the gasification air. Contrary to the prior art solutions, an active attempt is made to prevent the transfer of heat from the combustion chamber to the fuel silo and the heating of the fuel. It has been found by measurements that the temperature of the gasification air in the cooling channel is between 40 to 80° C. By the same measurements it has been found that the temperature of the fuel in the fuel silo at the height of the level of the upper edge of the catcher is about 80° C. The measurement results confirm that in operation, the cooling channel functions in the designed manner and effectively reduces the transfer of heat from the combustion chamber to the fuel silo.

In operation, the fuel silo is rotated, whereupon the fuel scraped by the catcher 28 from the bottom of the fuel silo flows into the combustion chamber. The fuel is gasified in the combustion chamber at a high temperature of about 1100 to 1300° C. Because the temperature of the fuel in the fuel silo is low, no pyrolysis takes place in practice in the fuel silo. The fuel is not significantly dried in the fuel silo, either, but when it has passed the catcher, the fuel is approximately in its former state of moisture. Thus the pyrolysis takes place in a very short passage between the end of the catcher and the fire ring. In this area, the temperature rises quickly from about 80° C. to 1100-1300° C. It is even possible for the pyrolysis to take place mainly or entirely below the fire ring in the combustion chamber. In any case, in the co-current gasifier according to the invention, the pyrolysis of the fuel takes place at least mainly in a substantially higher temperature than in the prior art co-current gasifiers. In addition, simultaneously with the pyrolysis, a large amount of water is evaporated from the damp fuel, and it is assumed to decompose into oxygen and water vapour in the high temperature. The hydrogen thus generated increases the hydrogen content of the product gas. Because of the extremely high temperature, the pyrolysis takes place clearly in a shorter time than in the prior art solutions. It is possible to control the high temperature, because a constantly regenerating, cup-shaped, insulating layer of carbon is formed in the area between the fire ring and the air nozzle, preventing the fire ring 50, support rings 52, 54 and the internal jacket from becoming overheated.

From literature sources it is known that the decomposing of the fuel particle into smaller parts speeds up the pyrolysis and the burning of the residual carbon. During the pyrolysis, the particles may decompose because of the pressure effect, when the water vapour and/or pyrolysis gases generated cannot exit from inside the particle fast enough. Thermal tensions and mechanical stress caused by rapid heating may also cause decomposing of the particles. Furthermore, it is known that when the primary tars react in a temperature of over 1100° C., the amount of tars decreases and the amount of product gases increases. The above mentioned scientific results support the view that in the co-current gasifier according to the invention the fuel is converted into product gas in an almost optimal manner and in optimal conditions. In particular, it is believed that the product gas produced by the method and co-current gasifier according to the invention contains significantly less tar compounds that restrict the use of the product gas.

The co-current gasifier according to the invention has been used in experimental conditions, in which fuel produced by the gasifier has been combusted in the engine of a vehicle in traffic. The experimental equipment has additionally included a simple water washer of the product gas, by which ash and other impurities have been separated from the product gas. About 120 000 km have been driven by the vehicle during seven years round the year without problems. The co-current gasifier according to the invention has also been used in another test equipment consisting of a gasifier, product gas washer and an engine-generator combination. The test equipment has been used for 600 hours without problems. It is generally known that a significant impediment for the use of product gas in engines is the tar compounds that are condensed on the surfaces of the engine and the intake manifold. The removal of tar compounds from the product gas is difficult without efficient and expensive purification equipment. The product gas produced by the co-current gasifier according to the invention does clearly not contain significant amounts of tar compounds, because the engines have functioned perfectly well without any need for purification for the whole test period.

The co-current gasifier according to the invention can also be manufactured as an embodiment, which has one fuel silo and more than one combustion chamber placed below the fuel silo. There can be 6 to 8 combustion chambers, for example, and they have been arranged in a circle. The structure of the combustion chambers corresponds to that described in the embodiment above. In the upper part of each combustion chamber there is a cooling channel, the purpose of which is to restrict the transfer of heat from the combustion chamber to the fuel silo. The restriction is carried out by transferring heat convected from the combustion chamber to the medium flowing in the cooling channel, such as cooling air.

Some preferred embodiments of the method and device according to the invention have been described above. The invention is not limited to the solutions described above, but the inventive idea can be applied in numerous ways within the scope defined by the claims. For example, in addition to gasification air or instead of it, some other medium, such as a liquid, preferably water, can be conducted along the cooling channel. In that case, two separate channel parts can be formed in the cooling channel, one for gasification air and the other merely for the cooling medium. The product gas produced by the co-current gasifier according to the invention can be used in numerous different applications, such as heat production, industrial processes, combined electricity and heat production and in the engines of vehicles.

The invention claimed is:

1. A co-current gasifier comprising:
    a fuel silo for the fuel to be gasified;
    at least one combustion chamber placed below the fuel silo; and
    a means for conducting gasification air into the gasifier, wherein,
    between the fuel silo and the combustion chamber there is a cooling channel for conducting a medium, such as gasification air, in order to restrict the transfer of heat,
    the combustion chamber comprises an internal jacket, an intermediate jacket, an external jacket and a grate, and
    the gasification air is arranged to be conducted to the combustion chamber through a space between the intermediate jacket and the external jacket.

2. The co-current gasifier according to claim 1, further comprising:
    an upper floor forming the upper surface of the cooling channel; and
    a lower floor forming the lower surface of the cooling channel, wherein,
    the fuel silo is placed above the upper floor and the combustion chamber below the lower floor.

3. The co-current gasifier according to claim 2, wherein the upper and lower floors have concentric holes for forming a connection between the fuel silo and the combustion chamber.

4. The co-current gasifier according to claim 1, wherein the combustion chamber and the fuel silo are located eccentrically in relation to each other.

5. The co-current gasifier according to claim 1, wherein the wall of the fuel silo extends at least partly outside the area delimited by the external jacket.

6. The co-current gasifier according to claim 1, wherein the fuel silo is formed as rotating around a longitudinal axis, and the gasifier has a rotator for rotating the fuel silo.

7. The co-current gasifier according to claim 2, wherein the internal jacket is fastened at its upper part to the lower floor, and the intermediate jacket is fastened at its upper edge to the internal jacket, at a distance from the lower floor.

8. The co-current gasifier according to claim 1, wherein in the upper part of the internal jacket of the combustion chamber there is a fire ring for forming a point of narrowing of the cross-sectional area in the upper part of the combustion chamber.

9. The co-current gasifier according to claim 8, further comprising air nozzles, which are placed in the internal jacket of the combustion chamber above the fire ring.

10. The co-current gasifier according to claim 1, further comprising a product gas pipe for leading the product gas generated out from the gasifier, and ash removal from the combustion chamber is arranged to take place through the product gas pipe.

11. The co-current gasifier according to claim 4, wherein the wall of the fuel silo extends at least partly outside the area delimited by the external jacket.

* * * * *